US006345564B1

(12) United States Patent
Kilner et al.

(10) Patent No.: US 6,345,564 B1
(45) Date of Patent: Feb. 12, 2002

(54) SEMI-LEVERED LANDING GEAR AND AUXILIARY STRUT THEREOF

(75) Inventors: Jerome Kilner, Bellevue; Gary Lindahl, Newcastle, both of WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/716,760

(22) Filed: Nov. 20, 2000

Related U.S. Application Data

(62) Division of application No. 09/281,457, filed on Mar. 30, 1999, now Pat. No. 6,182,925.

(51) Int. Cl.[7] .............................. F01B 7/20; F15B 15/24
(52) U.S. Cl. ......................... 91/169; 91/189 A; 91/399
(58) Field of Search ............................... 91/169, 189 A, 91/357, 395, 399, 402, 410; 92/112, 114

(56) References Cited

U.S. PATENT DOCUMENTS

| | | | |
|---|---|---|---|
| 3,073,586 A | | 1/1963 | Hartel |
| 3,228,305 A | * | 1/1966 | Wills ........................... 91/378 |
| 4,359,199 A | | 11/1982 | Kramer et al. |
| 4,381,857 A | | 5/1983 | Cook |
| 4,749,152 A | | 6/1988 | Veaux et al. |
| 4,773,300 A | * | 9/1988 | Klatt et al. .................... 91/169 |
| 4,892,270 A | | 1/1990 | Derrien et al. |

(List continued on next page.)

FOREIGN PATENT DOCUMENTS

| | | |
|---|---|---|
| EP | 246949 | 11/1987 |
| EP | 295174 | 12/1988 |
| EP | 328395 | 8/1989 |
| GB | 1006522 | 10/1965 |
| GB | 1510554 | 5/1978 |
| GB | 2101542 | 1/1983 |

OTHER PUBLICATIONS

Stuart Birch, Supersonic business and commericial jets, Aerospace Engineering, Sep. 1998, pp. 12–13.
Guy Norris, Boeing studies triple–engined 777X, Flight International, Jul. 15–21, 1998, p. 5.
Lee Ann Shay, Dassault's Tilting Bogies, AM, Aug. 1998, p. 26.

Primary Examiner—F. Daniel Lopez
(74) Attorney, Agent, or Firm—Alston & Bird LLP

(57) ABSTRACT

A semi-levered landing gear includes a main strut, a wheel truck pivotally attached at a main pivot to a lower end of the main strut and supporting forward and aft wheels, and an auxiliary strut attached at its upper end to the main strut and at its lower end to the wheel truck forward of the main pivot. The auxiliary strut includes a main piston that slides within a cylinder barrel and is attached at its lower end to the auxiliary pivot, and a floating piston that slides relative to the cylinder barrel and the main piston and divides the cylinder barrel into a pair of fluid chambers. The main piston includes snubbing holes or orifices through which fluid can flow between the two fluid chambers. The auxiliary strut also includes a lock-up valve that slides relative to the floating and main pistons and is configured to close the fluid path through the snubbing holes or orifices when the main and floating pistons are in predetermined positions relative to the lock-up valve, thereby locking the strut at a predetermined fixed length. The lock-up valve is configured such that the strut locks up at an intermediate length between a minimum and a maximum length of the strut, so that on takeoff, as the main strut extends, the auxiliary strut locks up to cause the wheel truck to tilt into a nose-up attitude. In one embodiment, the lock-up valve is actuatable to move into either a retracted position providing a short extension before locking up, or an extended position enabling the auxiliary strut to extend a greater amount before locking up. The auxiliary strut is also actuatable to extend the main piston for stowing the landing gear and to retract the main piston for tilting the wheel truck on landing approach.

12 Claims, 6 Drawing Sheets

U.S. PATENT DOCUMENTS

| | | | |
|---|---|---|---|
| 4,907,492 A | * 3/1990 | Hampejs | 91/378 |
| 4,940,197 A | 7/1990 | Putnam | |
| 5,094,407 A | 3/1992 | Jampy et al. | |
| 5,110,068 A | 5/1992 | Grande et al. | |
| 5,158,267 A | 10/1992 | Pascal | |
| 5,299,761 A | 4/1994 | Robin et al. | |
| 5,429,323 A | 7/1995 | Derrien et al. | |
| 5,460,340 A | 10/1995 | White | |

* cited by examiner

SEMI-LEVERED LANDING GEAR AND AUXILIARY STRUT THEREOF

CROSS-REFERENCE TO RELATED APPLICATIONS

This application is a divisional of application Ser. No. 09/281,457, filed Mar. 30, 1999, now U.S. Pat. No. 6,182,925.

FIELD OF THE INVENTION

The invention relates to landing gear for an aircraft. More particularly, the invention relates to landing gear of the type having a wheel truck formed by a bogie beam supporting forward and aft wheels at forward and aft ends thereof, a main strut pivotally connected to the bogie beam at a main pivot between the forward and aft wheels, and an additional mechanical linkage connected between the main strut and the bogie beam at a location spaced from the main pivot for controlling position of the bogie beam.

BACKGROUND OF THE INVENTION

In most large commercial aircraft, the maximum rotation angle of the aircraft during takeoff and landing is limited by a minimum permissible clearance between a rear under portion of the fuselage and the ground. It is known that the takeoff and landing performance of a given aircraft can be enhanced by providing a longer main landing gear about which the aircraft rotates to achieve a nose-up attitude, thereby increasing the maximum rotation angle of the aircraft. However, one of the objectives of aircraft design is to configure the landing gear so that the aircraft fuselage is essentially horizontal during ground operations and has an appropriate sill height for ground servicing. The maximum sill height that is acceptable is dictated by the height of ground equipment that must interface with the aircraft, and thus is generally fixed. In many cases, the maximum allowable sill height is less than what would be desirable from an aircraft performance standpoint, and therefore, merely lengthening the landing gear is not a viable approach to achieving increased maximum rotation angle. Further, landing gear length must be minimized to keep weight to a minimum and to facilitate the stowing of the gear during flight, and hence a wholesale lengthening of the landing gear is undesirable.

In view of the above considerations, efforts have been made to develop variable-length landing gear capable of assuming a length that is suitable for stowing within the aircraft, and for ground operations while the aircraft is on the ground and stationary, and further capable of assuming a greater length during takeoff and landing operations. One such type of variable-length landing gear, to which the present invention relates, is the semi-levered landing gear (SLG). In a typical SLG, a wheel truck is formed by a bogie beam supporting forward and aft wheels at forward and aft ends thereof, and a main strut of conventional design is pivotally connected to the bogie beam at a main pivot between the forward and aft wheels. An additional mechanical linkage is connected at an upper end to the main strut and at a lower end to the bogie beam at an auxiliary pivot spaced from the main pivot for controlling positioning of the bogie beam. The additional mechanical linkage enables the bogie beam, under certain conditions, to pivot about the auxiliary pivot rather than the main pivot. In this manner, when the aircraft approaches the end of a takeoff roll and begins to rotate for liftoff, the bogie beam can be placed in a tilted orientation with the forward wheels off the ground with the aid of the additional mechanical linkage, which prevents the bogie beam from rotating to a horizontal orientation. With the wheel truck in this tilted position, the effective length of the landing gear is increased relative to its length when all wheels are on the ground. The aircraft can then rotate to a higher pitch attitude, with the same tail clearance, thus achieving improved takeoff performance.

Existing semi-levered landing gears can be unsatisfactory for various reasons.

In some types of SLG configurations, such as that disclosed in U.S. Pat. No. 4,892,270 to Derrien et al., the additional mechanical linkage comprises a passive torque link assembly whose only function is to lock up when the main strut and the bogie beam assume particular positions, namely, when the bogie beam is tilted and the main strut is relatively uncompressed as it is on initial touchdown and at liftoff. These types of SLG devices require an additional actuator or spring device for placing the bogie beam in the tilted position for landing. Where the means for tilting the bogie beam is a passive spring device as in the Derrien '270 patent, stowing of the landing gear in the aircraft can be complicated by the lack of ability to reposition the bogie beam in a more-appropriate position for stowage.

One method that has been used to reposition the bogie for stowage with this type of SLG employs a shrink-link main strut that is operable to shorten as the landing gear is retracted into the wheel well, thereby changing the geometry of the SLG link and bogie so that the gear can be stowed. A disadvantage of this approach is that the shrink-link main strut is of considerably greater complexity and weight than a conventional main strut, thereby adding cost and weight to the aircraft.

Accordingly, some SLG configurations employ an active device connected between the main strut and the bogie beam for placing the bogie beam in a tilted position. For example, published UK Patent Application No. GB 2,101,542A by Putnam et al. discloses an aircraft undercarriage unit having a variable length oleopneumatic strut connected between the main strut and an aft end of the bogie beam. The variable length strut is hydraulically actuated to extend so as to tilt the bogie beam during takeoff. After takeoff, the variable length strut is contracted to position the bogie beam substantially horizontal to facilitate stowage of the gear. A major problem with Putnam's landing gear design is that it is incapable of maintaining equal loading on all main gear wheels during braking at all aircraft weight and aerodynamic lift conditions, because the variable-length strut is always active to exert a force on the bogie tending to tilt the bogie, which occurs when the overall load on the landing gear drops to a sufficiently low level. The result is that Putnam's landing gear would require larger brakes, and larger wheel wells to contain them, in order to assure adequate braking capacity during landing rollout or refused takeoff, thus incurring a significant penalty to the aircraft design in terms of weight and wheel well volume.

Another type of main landing gear is disclosed in UK Patent 1,510,554 by Faithfull. The Faithfull patent states as its object and advantage the capability of effectively lengthening the landing gear at touchdown to provide improved shock absorbing characteristics during landing at relatively high descent rates. The landing gear purportedly achieves this object by the use of an additional oil-filled cylinder, functioning only as a passive damper, pivotally attached to the front of the bogie beam and the upper stationary part of the main shock strut. In preparation for landing, the bogie is placed into a tilted position via a positioning device that is separate from the oil-filled cylinder. In this tilted position, the oil-filled cylinder is in a compressed condition. Upon touchdown and landing rollout, the bogie begins to rotate toward a horizontal position, thus causing the oil-filled cylinder to be extended until it reaches its maximum length. The maximum length of the oil-filled cylinder is such that the bogie cannot rotate to a fully horizontal position during the initial portion of the landing rollout, and hence the effective length of the landing gear is greater during this initial portion of the rollout.

Faithfull does not claim that his device is capable of providing improved takeoff performance through effective gear lengthening. Moreover, Faithfull's device would prevent the most advantageous positioning of the bogie for stowage of the gear in the aircraft. In order to stow the landing gear in most aircraft, the bogie advantageously should be placed in an approximately horizontal position (on some large commercial aircraft, the bogie must rotate past horizontal into a pitch-down attitude of as much as 15 degrees) with the main strut fully extended, this orientation enabling the wheel well size to be kept to a minimum. However, Faithfull's oil-filled cylinder has a maximum extension selected such that the bogie is tilted into a pitch-up attitude when the main strut is slightly compressed on landing. Thus, the oil-filled cylinder simply cannot extend sufficiently to position the bogie horizontal with the main strut fully extended. If the oil-filled cylinder disclosed in Faithfull were modified to provide sufficient stroke to accommodate the bogie stow position, it would be incapable of providing the semi-levered function on landing. Furthermore, if the stroke length were selected to provide effective semi-levered function on takeoff, then the bogie would assume a pitch-up attitude for stowage, which would require a very large wheel well. Thus, Faithfull's device is incapable of simultaneously providing semi-levered function and enabling an optimum positioning of the bogie for stowage.

A main landing gear configuration disclosed in U.S. Pat. No. 4,749,152 is said to provide an effectively longer landing gear at takeoff, but requires a very complex main strut having multiple main strut cylinders, some with offset loading. This main strut would result in a very heavy landing gear relative to a conventional main strut. Additionally, the landing gear in the '152 patent requires a shrink-link mechanism to reposition the bogie for stowage. Furthermore, the multiple-cylinder design results in sliding surfaces that cannot be inspected without major disassembly, thus increasing maintenance costs. Finally, another disadvantage of the gear design disclosed in the '152 patent is that all of the purported functions of the gear, including semi-levered action at takeoff, absorption of energy at touchdown, equal wheel loading during ground roll, and bogie repositioning, are provided by the main strut. This may hamper the optimization of each of these functions because of space and geometry limitations of the design.

SUMMARY OF THE INVENTION

The present invention provides a semi-levered landing gear that, in preferred embodiments, is capable of eliminating the aforementioned shortcomings of the prior art. The landing gear includes a single auxiliary strut in conjunction with a main strut, which can be of conventional design, and a multiple-wheeled bogie. The auxiliary strut, in preferred embodiments of the invention, enables the landing gear to provide all of the desirable functions required of a main gear during aircraft operation, including:

(1) the ability to tilt the bogie to provide an effectively longer main landing gear during takeoff rotation and liftoff, (2) the ability to reposition the bogie beam to an appropriate angle for stowing the landing gear;

(3) the ability to position the bogie beam to an appropriate pitch-up angle in preparation for landing after landing gear deployment, and thereby facilitate an early air-ground sensing upon initial ground contact of the aft bogie wheels;

(4) the ability to effectively decouple the auxiliary strut during static and ground-roll operations so as to facilitate equal loading of all main gear wheel and, accordingly, optimum braking ability;

(5) the ability to deactivate the functioning of the auxiliary strut that provides the semi-levered action when desired, such as during landing, so that the auxiliary strut acts as a damping device for partially absorbing touchdown loads such that the load transmitted to the aircraft is reduced.

To these ends, a semi-levered landing gear in accordance with a preferred embodiment of the invention comprises a wheel truck including a bogie beam and at least one forward wheel and at least one aft wheel rotatably supported by the bogie beam at forward and aft portions thereof, respectively, a main strut having an upper portion and a lower portion telescopingly connected to each other such that the main strut is extendable and compressible, the lower portion having a lower end pivotally connected to the bogie beam at a main pivot located between the forward and aft wheels, and an auxiliary strut having an upper end pivotally connected to the upper portion of the main strut and a lower end pivotally connected to the bogie beam at an auxiliary pivot longitudinally spaced from the main pivot. The auxiliary strut comprises a cylinder barrel having a closed end and an open end, a piston assembly slidably received through the open end of the cylinder barrel, and a lock-up device operable to permit extension of the piston assembly during a portion of a stroke thereof until the auxiliary strut reaches a predetermined lock-up length between a maximum length and a minimum length thereof. The lock-up device substantially prevents further extension of the piston assembly once the auxiliary strut reaches the predetermined lock-up length. The main strut and auxiliary strut are constructed and arranged relative to each other and the bogie beam such that, during takeoff as the main strut extends, the auxiliary strut becomes locked at the predetermined lock-up length before the main strut fully extends such that further extension of the main strut causes the bogie beam to pivot about the auxiliary pivot so as to tilt the bogie beam, whereby the landing gear is effectively lengthened. The main strut can be of conventional design; no shrink-link or other complex and heavy main strut is needed.

Preferably, the auxiliary strut is connected to a forward portion of the bogie beam. Thus, during a takeoff roll as the main strut extends, the auxiliary strut initially may extend but when it reaches its lock-up length it locks up. This causes the wheel truck to pivot into a nose-up attitude as the main strut further extends, forcing the aft wheels against the ground and thereby effectively lengthening the landing gear.

Preferably, the piston member of the auxiliary strut is actuatable by application of fluid pressure to cause retraction of the piston assembly to a predetermined landing approach length less than the predetermined lock-up length, whereby application of fluid pressure to the auxiliary strut prior to landing causes the wheel truck to be moved into a tilted position such that upon initial touchdown the aft wheel contacts the ground while the forward wheel is still above the ground. During landing, when the aft wheel makes initial contact with the ground, the auxiliary strut initially extends to allow the bogie beam to rotate slightly toward horizontal. When the auxiliary strut reaches the predetermined lock-up length, the lock-up device operates to stop further extension and prevent further rotation of the bogie beam.

In a preferred embodiment, the piston assembly divides the cylinder barrel into a pair of fluid chambers and defines a fluid path between the two fluid chambers such that extension and retraction of the piston assembly cause fluid to flow through the fluid path between the chambers. The lock-up device preferably comprises a lock-up valve disposed within the auxiliary strut and operable to maintain the fluid path open during a portion of an extension stroke of the piston assembly so as to permit extension of the piston assembly until the auxiliary strut reaches the predetermined lock-up length. The lock-up valve is operable to close the fluid path at the end of the portion of the stroke so as to substantially prevent further extension of the piston assembly and substantially lock the strut at the predetermined lock-up length.

In accordance with a further preferred embodiment of the invention, the piston assembly of the auxiliary strut includes a piston member actuatable by application of fluid pressure to cause extension of the piston assembly to the maximum length. The maximum length of the auxiliary strut is suitably chosen such that extension of the auxiliary strut to the maximum length after takeoff causes the wheel truck to be moved into a position having the bogie beam approximately horizontal to facilitate stowing the landing gear in the aircraft.

A still further preferred embodiment of the invention provides a dual-mode auxiliary strut having two different lock-up lengths, one optimized for takeoff and the other optimized for landing. In accordance with this embodiment, the lock-up valve is constructed such that application of a differential fluid pressure of one sense or an opposite sense across the lock-up valve causes the lock-up valve to be positioned in either an extended position or a retracted position and thereby increase or decrease, respectively, the length of the strut at which the lock-up valve closes the fluid path between the fluid chambers to lock up the strut. Thus, on landing approach, the lockup valve is actuated to move into the extended position so that the auxiliary strut undergoes a relatively longer extension stroke before locking up, thus enabling the bogie beam to rotate partially toward horizontal on initial touchdown so as to reduce transmission of touchdown loads to the aircraft. Conversely, on takeoff, the lock-up valve is actuated to move into the retracted position so that the auxiliary strut undergoes a relatively shorter extension stroke before locking up, thus facilitating a greater rotation angle of the aircraft.

Positioning of the lock-up valve is provided, in accordance with a preferred embodiment of the invention, by a fluid supply system connected to the auxiliary strut and operable to apply a differential fluid pressure of one sense or an opposite sense across the lock-up valve. Preferably, the fluid supply system includes a sensor operable to provide a signal when the aircraft touches down, and the fluid supply system is operable to reverse the sense of the differential fluid pressure applied across the lock-up valve upon a predetermined amount of time elapsing following receipt of the signal so as to retract the lock-up valve and place the auxiliary strut in a takeoff mode having a shorter lock-up length than a landing mode.

A preferred auxiliary strut has a piston assembly comprising a floating piston contained within the cylinder barrel and slidable therein along an axis of the cylinder barrel, the floating piston having an end wall that divides the cylinder barrel into the pair of fluid chambers and includes an aperture extending axially therethrough, and a main piston having a tubular portion slidably received through the open end of the cylinder barrel and through the aperture in the end wall of the floating piston such that the floating piston and main piston are slidable relative to each other. The main piston and floating piston cooperatively define the fluid path between the two fluid chambers, and the lock-up valve is arranged with respect to the main piston and floating piston to close the fluid path when the piston assembly is extended to the predetermined lock-up length. In one preferred embodiment, the tubular portion of the main piston defines snubbing holes therethrough providing the fluid path between the two fluid chambers, and the lock-up valve is arranged to open and close the snubbing holes upon movement of the main piston relative to the lock-up valve. Preferably, the lock-up valve includes a valve member slidably disposed in the tubular portion of the main piston. The valve member is positioned relative to the snubbing holes such that extension of the main piston causes the valve member to close the snubbing holes.

The floating piston and main piston advantageously include cooperative engagement portions that coact upon retraction of the floating piston in the cylinder barrel such that the floating piston retracts the main piston. In one embodiment, the engagement portions comprise the end wall of the floating piston and an annular flange portion attached to the tubular portion of the main piston and arranged to be abutted by the end wall of the floating piston when the floating piston is retracted. Retraction of the floating piston thus retracts the main piston so as to reduce the length of the auxiliary strut. This enables the bogie beam to be placed in a tilted position in preparation for landing.

Actuation of the floating piston to retract the main piston is accomplished by application of fluid pressure across the floating piston. To this end, the floating piston preferably includes a generally cylindrical portion connected to the end wall of the floating piston and arranged within the cylinder barrel such that an annular floating piston control chamber is defined between the cylindrical portion of the floating piston and an inner wall of the cylinder barrel. The auxiliary strut includes a fluid passage extending into the floating piston control chamber and adapted to be connected to a fluid source operable to selectively vary the pressure of fluid supplied through the fluid passage into the floating piston control chamber for controlling movement of the floating piston.

To facilitate positioning the bogie beam horizontally for gear stowage, the auxiliary strut preferably is actuatable to extend the floating piston and main piston to a maximum length. Further, the floating piston preferably is both retractable and extendable by fluid pressure. This is accomplished by providing a fluid passage extending into one of the fluid chambers of the strut and adapted to be connected to a fluid source. A fluid supply system is connected to the fluid passages that extend into the floating piston control chamber and the one of the fluid chambers of the strut. The fluid supply system is operable to apply a differential fluid pressure of one sense between the floating piston control chamber and the one of the fluid chambers so as to retract the floating piston which in turn retracts the main piston, and is operable to apply a differential fluid pressure of an opposite sense between the floating piston control chamber and the one of the fluid chambers so as to extend the floating piston and the main piston. Thus, the auxiliary strut preferably provides both a capability of tilting the bogie beam for landing and a capability of placing the bogie beam in a horizontal position for gear stowage.

BRIEF DESCRIPTION OF THE DRAWINGS

The above and other objects, features, and advantages of the invention will become more apparent from the following description of certain preferred embodiments thereof, when taken in conjunction with the accompanying drawings in which.

DETAILED DESCRIPTION OF THE DRAWINGS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
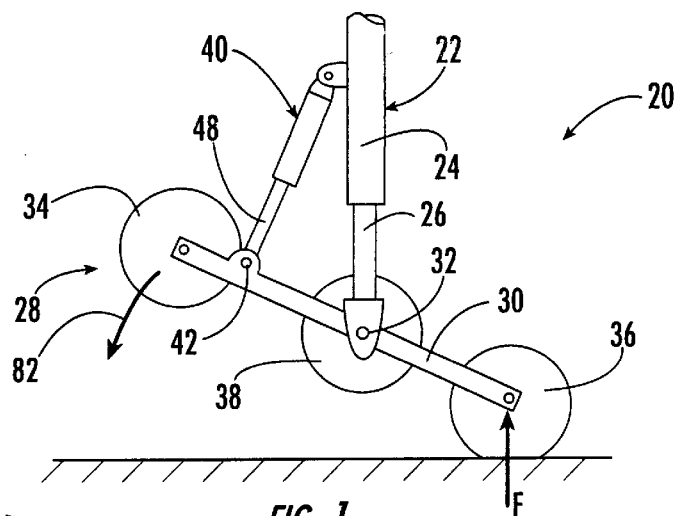
FIG. 1 is a schematic side elevation of a semi-levered landing gear in accordance with a preferred embodiment of the invention, showing the gear at initial touchdown when the aft wheel has just made contact with the ground or during takeoff rotation just prior to liftoff.

With reference to FIG. 1, a semi-levered landing gear 20 in accordance with a preferred embodiment of the invention is shown at initial touchdown. The gear 20 includes a main strut 22 of suitable construction to absorb and damp transient loads exerted between the gear and the ground during ground operations of an aircraft, and to support the aircraft when stationary on the ground. The main strut 22 typically includes a cylinder portion 24 and a piston portion 26 that is telescopingly received in the cylinder portion such that the length of the main strut 22 can vary depending on the amount of load applied to the landing gear in a direction along the axis of the main strut. On initial touchdown, as shown in FIG. 1, the amount of load applied to the landing gear 20 is relatively small and, accordingly, the length of the main strut 22 is essentially at a maximum.

The landing gear 20 further includes a wheel truck 28 formed by at least one bogie beam 30 pivotally attached at a main pivot 32 to a lower end of the piston portion 26 of the main strut, and a plurality of wheels rotatably supported by the bogie beam 30, including at least one forward wheel 34 and at least one aft wheel 36 respectively supported at a forward end and an aft end of the bogie beam 30. The wheel truck 28 shown in FIG. 1 may include one or more middle wheels 38 located at an intermediate position between the forward and aft wheels. In general, for most commercial passenger aircraft, the wheel truck of a main landing gear includes at least a pair of forward wheels journaled on an axle and a pair of aft wheels journaled on an axle, and some wheel trucks include a third middle pair of wheels journaled on an axle. However, the present invention is applicable to any wheel truck configuration having at least one wheel supported by a bogie beam at a location that is longitudinally displaced forward or aft of a main pivot at which a main strut is attached to the bogie beam.

The landing gear 20 also includes an auxiliary strut 40 that is pivotally connected at its upper end to the cylinder portion 24 of the main strut 22 and has its lower end pivotally connected at an auxiliary pivot 42 to the bogie beam 30 at a location forward of the main pivot 32. The auxiliary strut 40 is a variable-length device enabling the bogie beam 30 to pivot relative to the main strut 22. Additionally, the auxiliary strut 40 is capable of locking up to a fixed length, when suitably controlled as further described below, such that the bogie beam 30 is forced to pivot about the auxiliary pivot 42 rather than about the main pivot 32 so as to provide a semi-levered function to the landing gear 20.

Figure 2:
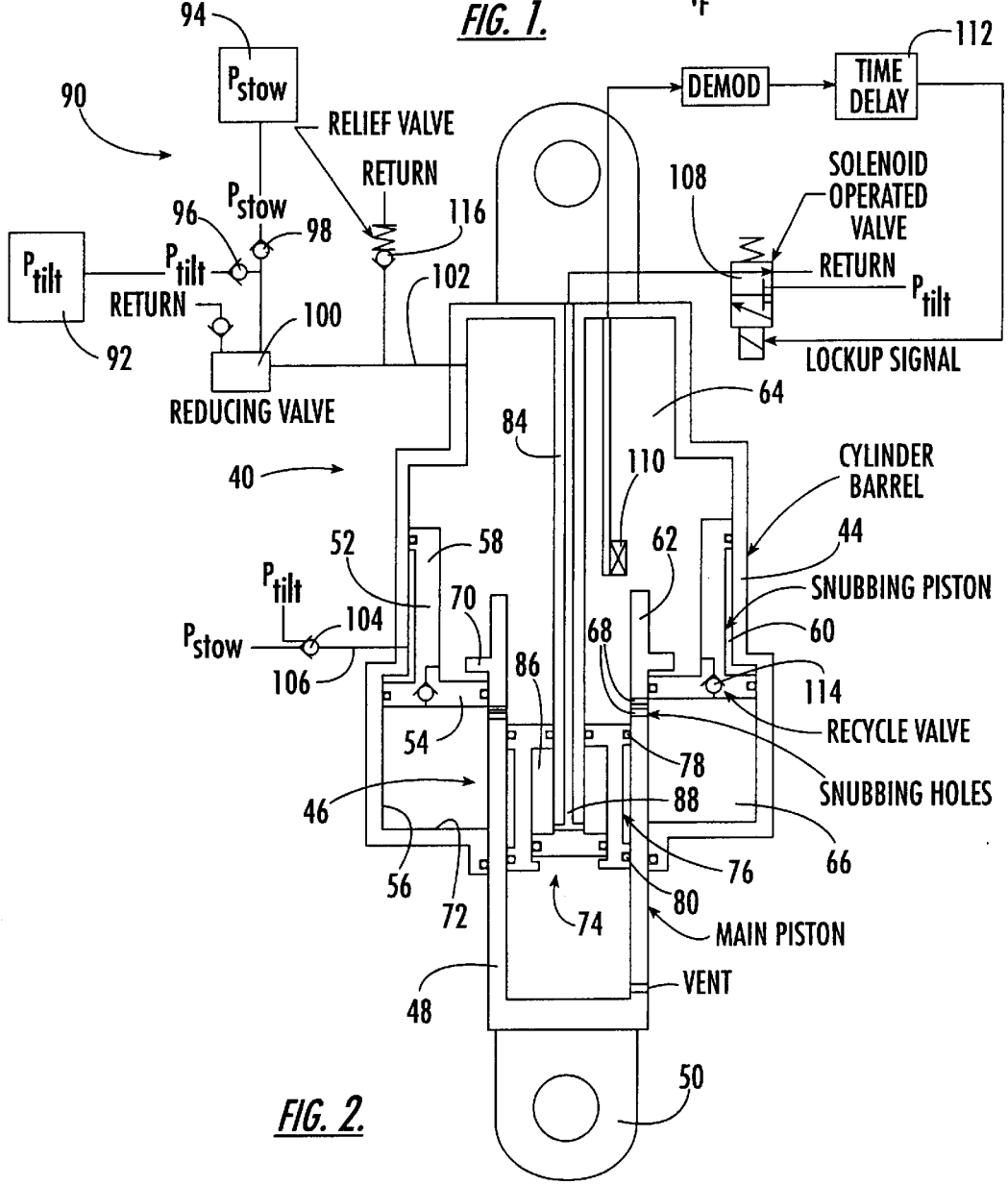
FIG. 2 is a schematic sectioned side elevation of an auxiliary strut in accordance with a preferred embodiment of the invention, showing the auxiliary strut in a retracted position for tilting the bogie beam of the semi-levered landing gear as shown in FIG. 1.

FIG. 2 depicts one preferred embodiment of the auxiliary strut 40 in greater detail. The strut 40 includes a cylinder barrel 44 and a piston assembly 46 slidably received through an open end of the cylinder barrel. The piston assembly 46 includes a main piston 48 having at least one lug 50 or other connecting member at its lower end for attachment to the bogie beam of a wheel truck, and a floating piston 52 that is entirely disposed within the cylinder barrel 44 and is slidable with respect to both the cylinder barrel 44 and the main piston 48. The floating piston 52 includes an end wall 54 whose outer periphery sealingly engages the inner cylindrical surface 56 of the cylinder barrel 44, and a generally cylindrical portion 58 that is attached to the end wall 54 and extends upwardly therefrom. The upper end of the cylindrical portion 58 sealingly engages the inner surface 56 of the cylinder barrel, and is configured such that a lengthwise extending part of the cylindrical portion 58 is spaced radially inwardly of the inner surface 56 of the cylinder barrel so as to create an annular floating piston control chamber 60 between the cylindrical portion 58 and the inner surface 56 of the cylinder barrel. As further described below, the floating piston control chamber 60 can be supplied with pressurized fluid, or alternatively can be evacuated, so as to extend or retract the floating piston 52 within the cylinder barrel 44 so as to vary the length of the strut 40 for rotatably positioning the bogie beam 30 of the landing gear shown in FIG. 1.

The end wall 54 of the floating piston 52 includes an aperture through which a tubular portion 62 of the main piston 48 is slidably received, and the inner periphery of the aperture sealingly engages the outer surface of the tubular portion 62. Thus, the end wall 54 of the floating piston 52 divides the interior of the cylinder barrel 44 into a pair of hydraulic chambers 64 and 66. The tubular portion 62 of the main piston 48 includes snubbing holes 68 extending therethrough so as to provide a fluid passage between the chambers 64 and 66. The tubular portion 62 further includes an annular flange 70 projecting outwardly therefrom adjacent an upper end of the tubular portion 62. When the flange 70 is in contact with the end wall 54 of the floating piston, forced extension of the main piston 48 from the cylinder barrel 44 causes the floating piston 52 to likewise be extended within the cylinder barrel. This movement of the floating piston 52 causes fluid to flow from the hydraulic chamber 66 through the snubbing holes 68 into the other hydraulic chamber 64. Conversely, if the floating piston 52 is retracted within the barrel 44, then as long as the flange 70 is in contact with the end wall 54, the main piston 48 is likewise retracted along with the floating piston 52, thus causing a reverse flow of fluid from the chamber 64 into the chamber 66. The snubbing holes 68 thus allow relatively free extension and contraction of the strut 40, and provide a degree of orifice-type damping dependent on the total flow area through the snubbing holes and the viscosity of the fluid.

Figure 3:
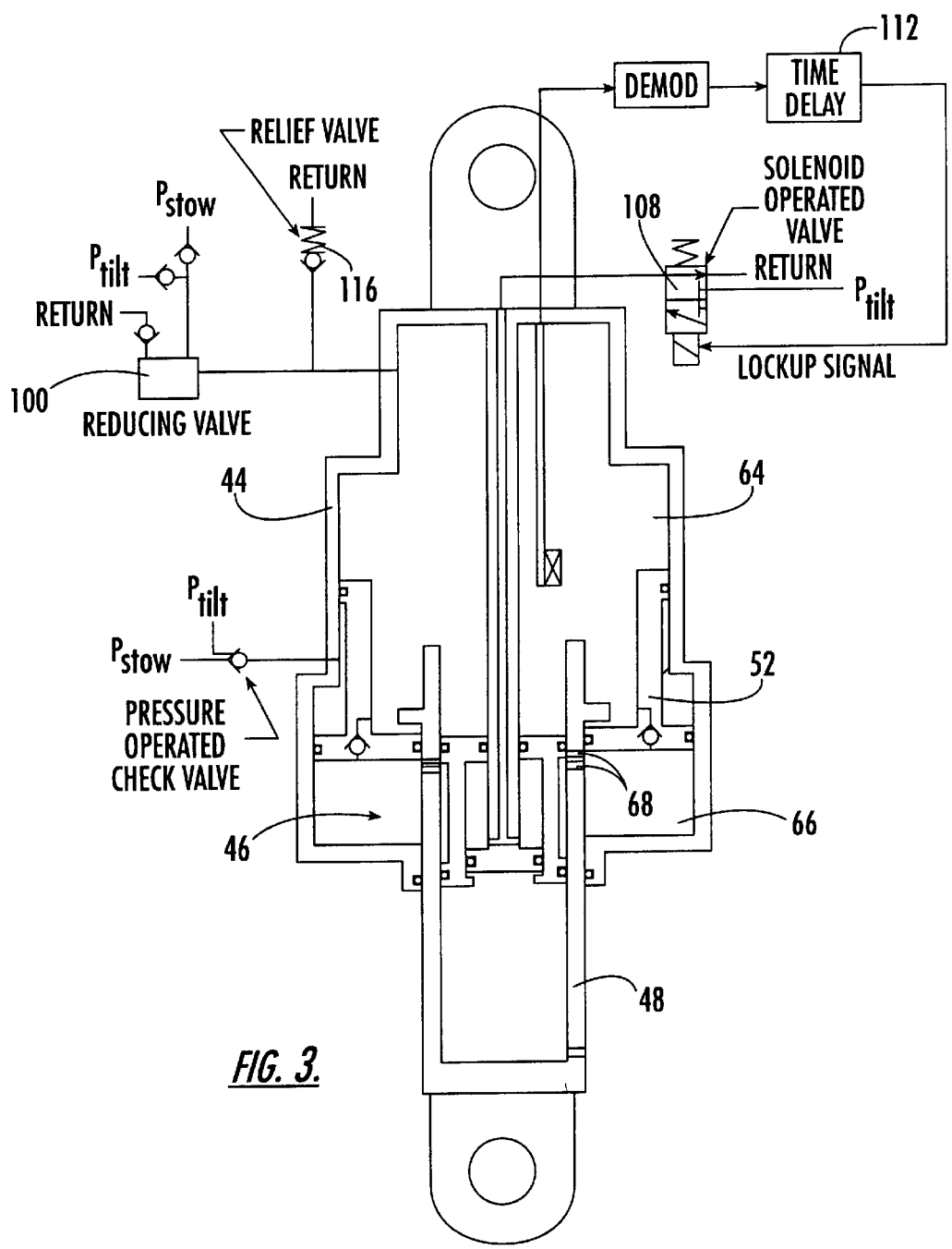
FIG. 3 is a sectioned side elevation similar to FIG. 2, showing the auxiliary strut in a lock-up position.

In accordance with the present invention, however, the snubbing holes 68 do not allow extension of the strut up to the mechanically limited maximum length thereof (which occurs when the floating piston 52 abuts the lower end stop 72 of the cylinder barrel 44 and the flange 70 of the main piston abuts the end wall 54 of the floating piston). Rather, the strut 40 includes a lock-up valve 74 that functions to close the fluid passage through the snubbing holes 68 when the strut reaches a predetermined lock-up length that is less than the maximum strut length. The lock-up valve 74 includes a valve member 76 that is disposed within the tubular portion 62 of the main piston 48 and sealingly engages the inner surface thereof at an upper end 78 of the lock-up valve and at a lower end 80 thereof spaced from the upper end 78. The main piston 48 is slidable relative to the valve member 76, which is operable to remain in a fixed location during extension of the piston assembly 46 of the strut. Accordingly, when the main piston 48 and floating piston 52 are extended from the generally retracted position shown in FIG. 2, during the initial portion of the extension stroke the snubbing holes remain open to allow fluid flow from the lower hydraulic chamber 66 to the upper hydraulic chamber 64. However, as the snubbing holes 68 are carried downward to and past the sealed upper end 78 of the lock-up valve member 76, as shown in FIG. 3, the snubbing holes are closed by the valve member 78 such that further flow of fluid between the chambers is prevented. The effect of this action is to lock the strut 40 at a predetermined lock-up length. It will be appreciated that the strut 40 can be configured to provide any desired lock-up length, by suitably proportioning the various components of the strut and appropriately locating the valve member 76 relative to the snubbing holes 68. It will be further appreciated that a progressive closing of the snubbing holes 68 can advantageously be provided by forming a series of snubbing holes 68 spaced lengthwise along the tubular portion 62 of the main piston so that damping of the strut extension progressively increases as the holes are progressively closed.

Figure 4:
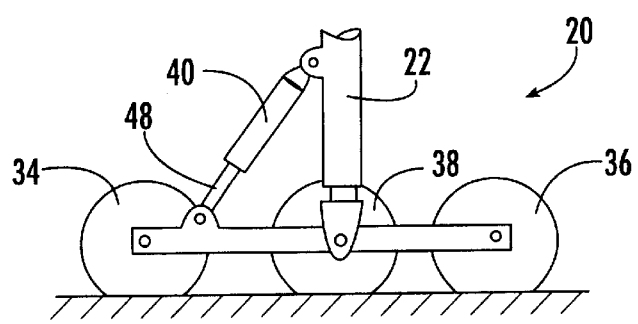
FIG. 4 is a view similar to FIG. 1, showing the landing gear in a ground static condition.

The lock-up capability of the strut 40 enables the landing gear 20 to function in a semi-levered fashion. More particularly, it is advantageous to construct the strut 40 such that when the floating piston 52 and main piston 48 are retracted to the positions shown in FIG. 2 on landing approach, the strut 40 causes the bogie beam 30 to be tilted into a nose-up position having the forward wheel 34 vertically higher than the aft wheel 36, as shown in FIG. 1. Thus, upon initial touchdown, the aft wheel 36 is the first to contact the ground. The ground load F exerted on the aft wheel 36 causes a pitching moment to be exerted on the bogie beam 30 tending to rotate the bogie beam toward a horizontal position, as indicated by arrow 82 in FIG. 1. Accordingly, the auxiliary strut 40 is placed in tension, and the main piston 48 and floating piston 52 are forcibly extended. As previously noted, the snubbing holes 68 are open during the initial portion of the extension stroke of the main piston 48 and floating piston 52, and thus the strut 40 allows the bogie beam 30 to rotate some amount, and provides viscous damping of the rotation of the bogie beam. This "lost motion" advantageously facilitates sensing of initial ground contact for other aircraft systems that are not a part of the present invention. It is advantageous to construct the strut 40 so that after a predetermined amount of bogie beam rotation but before all of the wheels contact the ground, the snubbing holes 68 become closed by the lock-up valve member 76 and the strut 40 locks up. Thus, for the initial portion of the landing roll, the landing gear 20 is effectively lengthened by the tilted orientation of the wheel truck 28. As the aircraft continues to lose speed during the landing roll, a greater and greater amount of the aircraft weight is exerted on the landing gear 20, and thus the main strut 22 is compressed more and more. Initially, the compression of the main strut 22 causes essentially no shortening of the auxiliary strut 40 and the bogie beam 30 pivots about the auxiliary pivot 42 until all of the wheels 34-38 are on the ground. Further compression of the main strut 22 then compresses the main piston 48 into the cylinder barrel 44 as shown in FIG. 4, and the main piston 48 separates from the floating piston 52 and is relatively freely compressed so that the landing gear 20 functions in a generally conventional manner.

Figure 6:
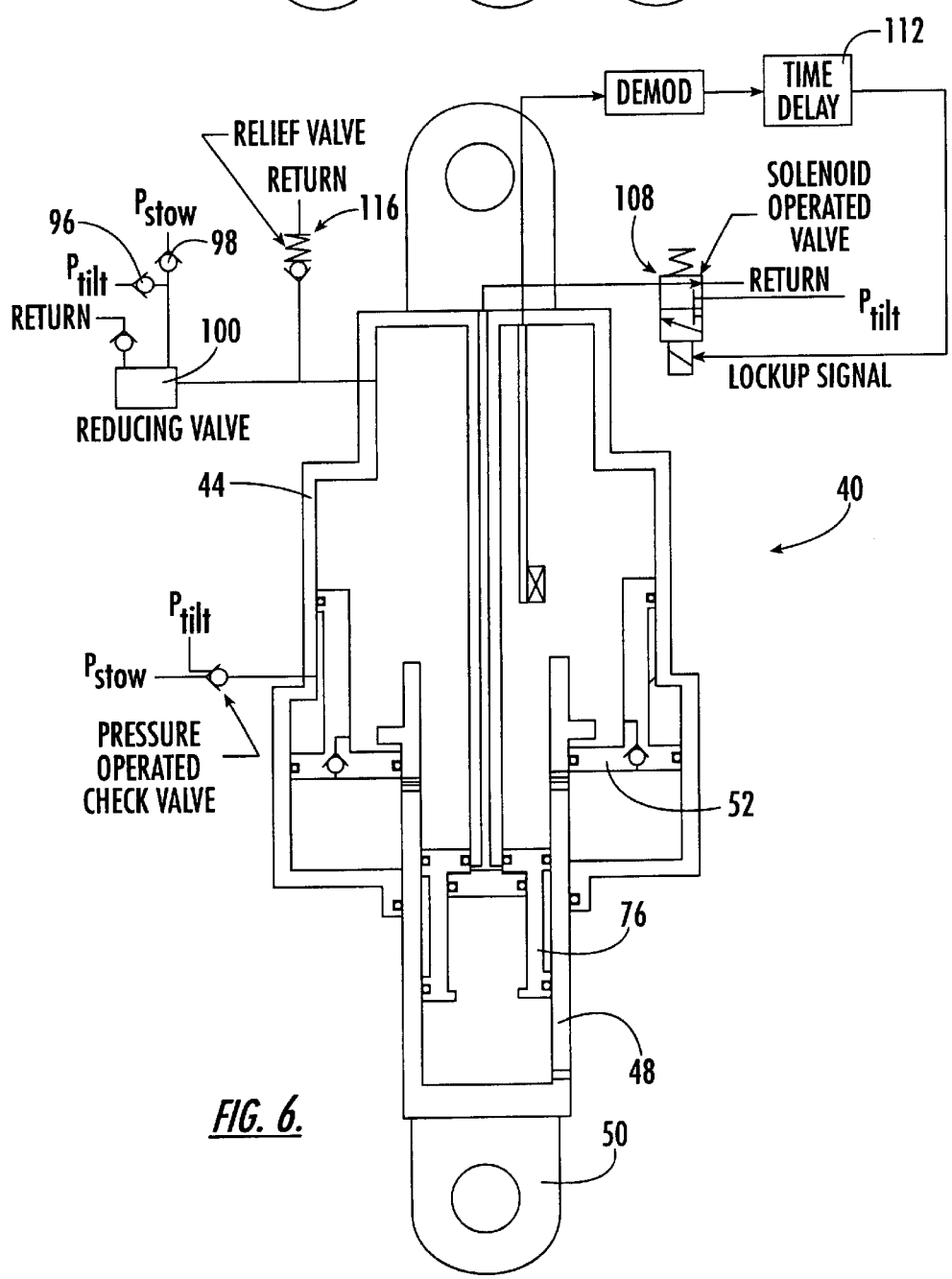
FIG. 6 is a view similar to FIG. 2, showing the auxiliary strut in a landing mode in which the lock-up valve member is extended to increase the lock-up length of the strut.

The auxiliary strut 40 in accordance with the present invention preferably has the capability of assuming two different lock-up lengths, one optimized for landing and one optimized for takeoff. In this manner, a greater amount of bogie beam rotation can be allowed on landing so that touchdown loads are absorbed and damped by the auxiliary strut before the strut locks up, while at takeoff the strut can lock up after a relatively short extension so as to enable a greater aircraft rotation angle. To these ends, the lock-up valve member 76 preferably is movable between a retracted position as shown in FIGS. 2 and 3 for providing a short extension before lock-up occurs, and an extended position as shown in FIG. 6 for providing a longer extension before lock-up occurs.

Advantageously, the valve member 76 is hydraulically actuated to move from one position to the other. The strut 40 includes a piston-type fluid supply member 84 fixed relative to the cylinder barrel 44 and extending into the interior of the tubular portion 62 of the main piston 48, and the lock-up valve member 76 sealingly surrounds the supply member 84 so as to define an annular lock-up control chamber 86 therebetween. The supply member 84 includes a fluid passage 88 that extends into the lock-up control chamber 86 for supplying pressurized fluid thereinto. Thus, the lock-up valve member 76 is acted upon on one side by fluid pressure within the upper hydraulic chamber 64 of the strut, and on the other side by fluid pressure within the lock-up control chamber 86. Accordingly, a pressure differential of one sense between the chamber 64 and the lock-up control chamber 86 will cause the valve member 76 to be retracted to the position of FIGS. 2 and 3, and a pressure differential of the opposite sense will cause the valve member 76 to be extended to the position of FIG. 6.

The landing gear and auxiliary strut in accordance with the present invention preferably includes a fluid supply system 90 operable to supply fluid at appropriate pressures to the various chambers of the strut 40 in order to effect movement of the lock-up valve member 76, and also to cause retraction of the floating piston 52 for tilting the bogie beam on landing approach and to extend the strut for positioning the wheel truck in a stowage position. The supply system 90 includes a source 92 of relatively high-pressure fluid at a pressure $P_{Tilt}$ and a source 94 of relatively high-pressure fluid at a pressure $P_{Stow}$, the sources 92 and 94 capable of being independently controlled to supply or shut off supply of fluid. The system 90 also includes a fluid return (not shown) such as a reservoir or the like, for return of fluid evacuated from the strut 40 so that the fluid can be recycled back to the fluid sources.

The fluid sources 92, 94 are connected through respective check valves 96, 98 to a pressure-reducing valve 100 operable to output fluid at a pressure between the supply pressure of sources 92, 94 and the fluid return pressure. The output of the pressure-reducing valve 100 is connected to a fluid passage 102 that extends into the upper hydraulic chamber 64 of the strut. The $P_{Stow}$ source 94 is connected through a pressure-operated check valve 104 to a fluid passage 106 that extends into the floating piston control chamber 60. The pressure-operated check valve is also connected to the $P_{Tilt}$ source 92 such that when the $P_{Tilt}$ source 92 is pressurized and the $P_{Stow}$ source 94 is depressurized, the pressure-operated check valve 104 opens and fluid is evacuated from the floating piston control chamber 60, thereby causing the floating piston 52 to be retracted as shown in FIG. 2. Valve 104 also acts to hold the floating piston 52 extended when the landing gear is retracted into the wheel well and all landing gear actuation system pressure is set to return. At the same time, pressure of the fluid in the upper hydraulic chamber 64, supplied from the pressure-reducing valve 100, causes the main piston 48 to stay in contact with the floating piston 52. Accordingly, the floating piston 52 causes retraction of the main piston 48, and the strut is contracted to a predetermined length. As previously noted, this length is preferably such as to place the wheel truck 28 of the landing gear in a tilted position, as shown in FIG. 1, in preparation for landing. This length of the strut is referred to herein as the "landing hold" position.

To control the position of the lock-up valve 74, the fluid supply system 90 in one embodiment includes an electrically operated solenoid valve 108 whose output is connected to the fluid passage 88 in the supply member 84. The solenoid valve includes a pair of inputs coupled to the $P_{Tilt}$ source 92 and to the fluid return. The solenoid valve 108 preferably is energized at takeoff so that the $P_{Tilt}$ pressure is directed through the fluid passage 88 to the lock-up valve 74, thereby retracting the valve member 76 so that the strut 40 locks up after a relatively short extension stroke. For landing, the solenoid valve 108 is de-energized so that return pressure is coupled to the lock-up valve 74 and the valve member 76 is extended so that the strut locks up after a relatively longer extension stroke. A lock-up signal is provided to the solenoid valve 108 by a suitable sensor operable to detect when the aircraft is on the ground. FIG. 2 depicts one embodiment in which the sensor is a proximity sensor 110 fixed in the cylinder barrel 44 and positioned to detect when the main piston 48 is compressed into the strut past the landing hold position shown in FIG. 2. The sensor 110 provides a signal to the solenoid valve 108 so as to cause a switch to the takeoff mode shown in FIG. 6. To assure that the switch to takeoff mode does not occur during touchdown transition (and to assure that a switch to landing mode does not occur during takeoff), the signal from the proximity sensor 110 preferably is passed through a time-delay unit 112, which preferably is operable to provide a 5–10 second time delay before the signal is supplied to the solenoid valve 108.

The strut 40 also includes a recycle valve 114 in the floating piston 52 between the chambers 64 and 66, which allows the floating piston 52 to return to a raised position after landing. A pressure relief valve 116 is also provided for relief of pressure spikes that can occur during landing and taxi when the landing gear encounter holes, bumps, or the like on the runway.

Figure 5:
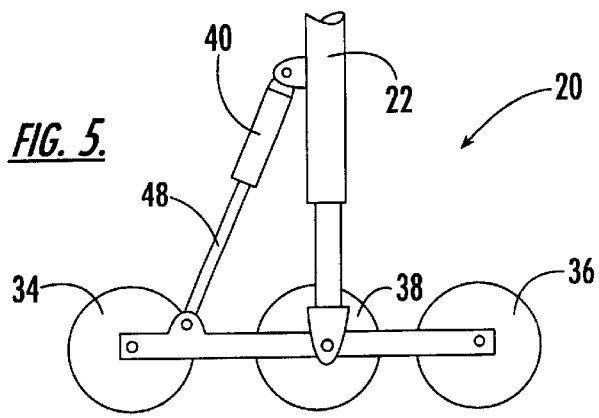
FIG. 5 is a view similar to FIG. 1, showing the bogie beam of the semi-levered landing gear in a stow position in preparation for the gear being stowed in an aircraft.

After takeoff, when the landing gear 20 is to be stowed in the aircraft, it is frequently necessary to position the wheel truck 28 in a position close to horizontal to facilitate stowage of the gear. The auxiliary strut 40 preferably provides the capability of actively extending to effect such positioning of the wheel truck. To this end, the $P_{Tilt}$ source 92 is depressurized and the $P_{Stow}$ source 94 is pressurized. Thus, $P_{Stow}$ pressure is directed into the floating piston control chamber 60, causing the floating piston to extend to the end stop 72, and the pressure from the pressure-reducing valve 100 supplied to the upper hydraulic chamber 64 causes the main piston 48 to stay in contact with the floating piston 48, so that the main piston 48 is extended to its maximum extent (referred to herein as the "stow position" of the strut). This causes the strut 40 to position the wheel truck 28 in a position suitable for stowage, as shown in FIG. 5.

Figure 7:
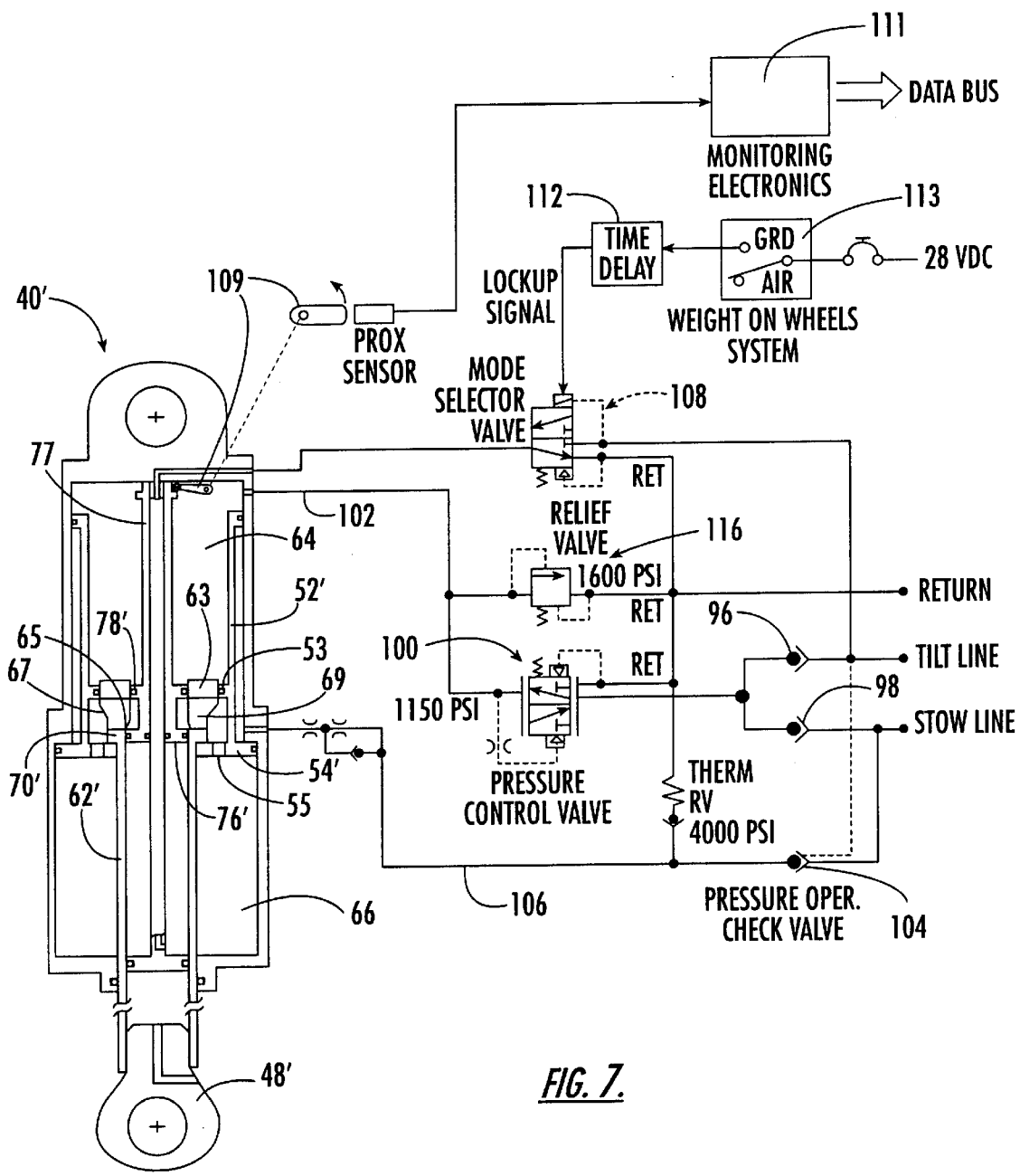
FIG. 7 is a sectioned side elevation of an alternative preferred embodiment of an auxiliary strut in accordance with the invention.

FIG. 7 depicts an alternative preferred embodiment of a strut and control system in accordance with the invention. The strut 40' of FIG. 7 is similar in most respects to the strut 40 of FIGS. 2, 3, and 6, and hence the present description of the strut 40' focuses primarily on those aspects that are different from the strut 40. The strut 40' includes a lock-up valve member 76' having an upper snubbing seal 78' on its outer periphery. Unlike the seal 78 of the lock-up valve member 76 of the previously described strut 40, the snubbing seal 78' does not maintain continuous sealing contact with the inner surface of the tubular portion 62' of the main piston 48'. Rather, the snubbing seal 78' sealingly contacts the inner surface of the tubular portion 62' only when the main piston 48' is near its lock-up position with respect to the lock-up valve member 76', as further described below. Additionally, the floating piston 52' includes a snubbing seal 53 on its inner periphery that similarly makes sealing contact with the outer surface of the tubular portion 62' only when the main piston 48' is near its lock-up position with respect to the lock-up valve member 76'.

The tubular portion 62' of the main piston 48' includes a generally annular flange portion 63 on its upper end. The flange portion 63 has an inner cylindrical surface having a diameter that is smaller than that of the rest of the tubular portion 62' and is joined therewith by an inner conical surface 65 that extends downwardly and outwardly. Similarly, the flange portion 63 has an outer cylindrical surface having a diameter that is larger than that of the rest of the tubular portion 62' and is joined with an outer conical surface 67 that extends downwardly and inwardly. The inner and outer cylindrical surfaces of the annular flange portion 63 are sized to make sealing contact with the snubbing seals 53 and 78'. The lock-up valve member 76' and the floating piston 52' are configured so that when both are fully retracted as shown in FIG. 7, the snubbing seals 53 and 78' can be simultaneously engaged by the outer and inner cylindrical surfaces of the annular flange portion 63 as shown. In this position of the strut, fluid flow between the two chambers 64 and 66 is prevented, and thus the strut is locked at a fixed length when in tension.

Figures 8, 9, 10:
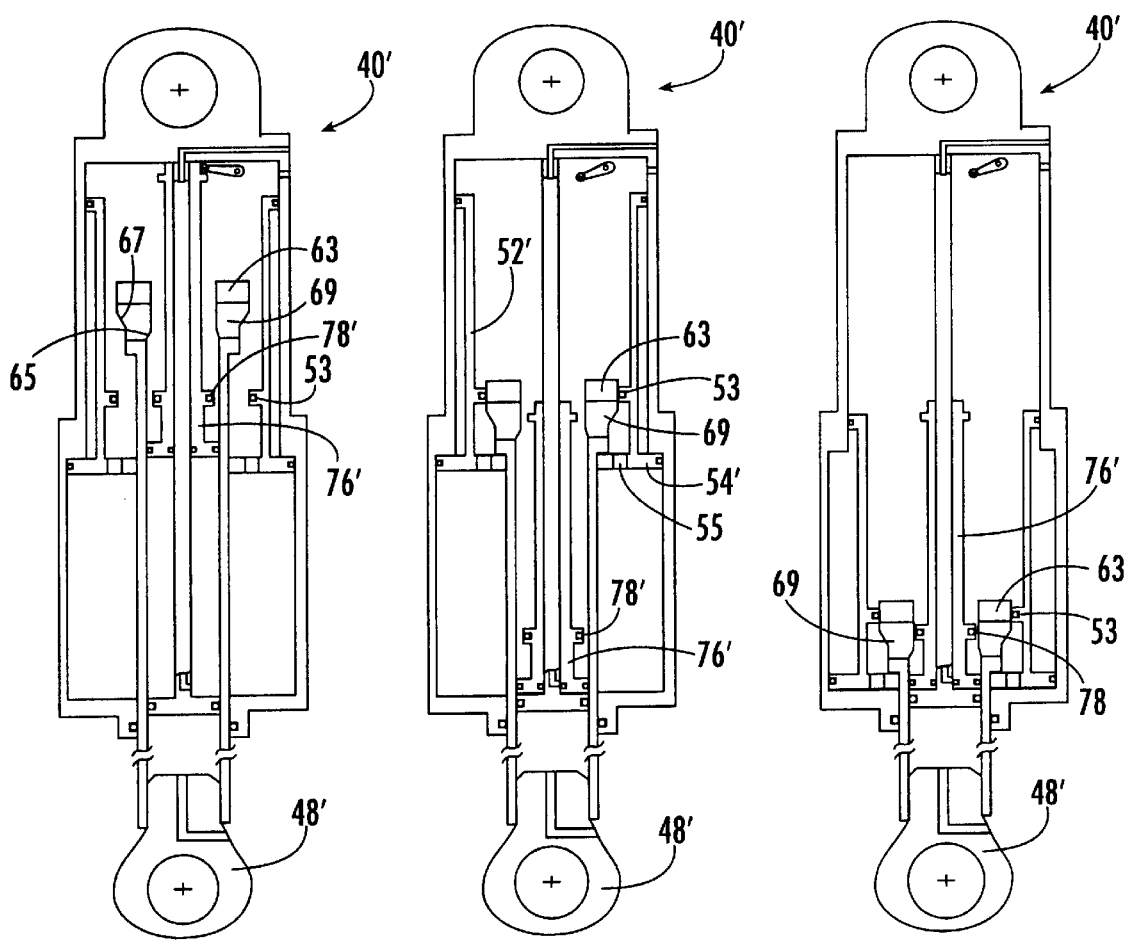
FIG. 8 shows the strut of FIG. 7 in a position that typically would exist when the aircraft is stationary on the ground.
FIG. 9 shows the strut of FIG. 7 in a position ready for landing.
FIG. 10 shows the strut of FIG. 7 is a fully extended stow position.

The tubular portion 62' of the main piston 48' includes at least one, and preferably several, slit orifices 69 that extend through the tubular portion 62' and are oriented with their lengthwise dimensions extending lengthwise along the tubular portion 62'. The slit orifices 69 preferably have their upper ends spaced below the upper end of the flange portion 63 but above the outer conical surface 67, and have their lower ends below the inner conical surface 65. Thus, when the main piston 48' is forcibly extended from an initially compressed position having the flange portion 63 disposed entirely above the snubbing seals 53 and 78' as, for example, when the aircraft is stationary on the ground as shown in FIG. 8, the snubbing seals 53 and 78' initially are not in contact with the tubular portion 62' of the main piston, and therefore the main piston 48' extends freely with comparatively little resistance. As the main piston further extends, the snubbing seal 78' first comes into engagement with the inner cylindrical surface of the annular flange portion 63 (and is guided into contact therewith by the conical surface 65), such that the snubbing seal 78' begins to cover a lower portion of the slit orifices 69. As the main piston 48' further extends, the snubbing seal 78' progressively covers more and more of the slit orifices 69. Next, the snubbing seal 53 makes sealing contact with the lower end of the cylindrical outer surface of the flange portion 63, which is just below the upper ends of the slit orifices 69. At this point, fluid flow through the slit orifices 69 is significantly throttled, such that further extension of the main piston 48' is substantially damped. As the main piston extends to its full extent relative to the floating piston 52' such that the flange 70' abuts the end wall 54' of the floating piston, the slit orifices 69 become fully closed by the snubbing seals 53 and 78', and the strut 40' is locked at a fixed length as shown in FIG. 7.

The snubbing seals 53 and 78' advantageously are formed by one or more rings of relatively stiff material that is sufficiently robust that the rings can tolerate repeated sliding over the conical surfaces 65 and 67 and over the slit orifices 69 without being cut or otherwise damaged, misshapen, or dislodged from their desired locations. For example, each of the snubbing seals may be formed by a solid ring of a plastic material.

The lock-up valve member 76' includes an elongate tubular portion 77 extending upwardly from the snubbing seal 78'. The lock-up valve member 76' is actuated to extend and retract by application of fluid pressure in the manner previously described in connection with the strut 40. The upper end of the tubular portion 77 is configured to engage a proximity switch 109 when the lock-up valve member 76' is in the retracted position as shown in FIG. 7, and the signal from the proximity switch 109 is provided to monitoring electronics 111 operable to monitor whether the strut 40' is in a takeoff mode (with the lock-up valve member 76' retracted) or a landing mode (with the lock-up valve member 76' extended).

The switch 109 can also be used during takeoff rotation to monitor the proper function of the auxiliary strut 40'. More particularly, if the lock-up valve member 76' moves out of position by a predetermined amount during rotation when the auxiliary strut is under heavy tension load, which may be indicative of internal damage to the strut such as seal leakage, logic contained in the monitoring electronics can identify that the strut needs maintenance.

The strut 40' is switched from one mode to the other by a signal received from an aircraft ground engagement-sensing system 113 that is operable to sense when a portion of the weight of the aircraft is supported by the landing gear. The signal from the ground engagement-sensing system 113 is fed through a time delay unit 112 to a solenoid valve 108 that operate as previously described in connection with the strut 40. Thus, the signal that initiates a mode change originates external to the strut 40' rather than within the strut.

FIG. 9 shows the strut 40' in a landing mode ready for initial touchdown on the ground. The lock-up control valve 76' is fully extended and the floating piston 52' and main piston 48' are fully retracted to place the wheel truck in a tilted nose-up position, as previously described. Accordingly, when the aircraft touches down, the main piston 48' and floating piston 52' will be forcibly extended as the wheel truck is rotated toward horizontal by the upward force exerted on the aft wheels of the truck. The strut 40' includes a plurality of relatively large fluid passages 55 through the end wall 54' of the floating piston 52' so that the floating piston 52' and main piston 48' extend with some damping as fluid passes through the slit orifices 69. The extended position of the lock-up valve member 76' is such that the main piston 48' and floating piston 52' can be extended to nearly their full extent before any significant snubbing of their movement begins. However, over the last portion of the extension of the main and floating pistons, the slit orifices 69 begin to be closed by the snubbing seal 78' so that the pistons are brought to a less abrupt halt than would otherwise be the case were no snubbing performed.

As the aircraft loses speed on a landing roll, the main strut of the landing gear becomes more and more compressed, and accordingly the strut 40' will begin to be compressed. The main piston 48' will separate from the floating piston 52' and be compressed upwardly into the strut. It should be noted that the passages 55 in the floating piston permit fluid flow from the upper chamber 64 to the lower chamber 66 when the main piston 48' is compressed, and thus the recycle valve 114 of the previously described strut 40 is eliminated.

FIG. 10 shows the strut 40' in a stow position with the lock-up valve member 76', the floating piston 52', and the main piston 48' fully extended. The slit orifices 69 are not completely closed in this position in order to prevent a vacuum from being formed in the lower chamber, since a vacuum could interfere with subsequent retraction of the floating piston and main piston.

Figure 11:
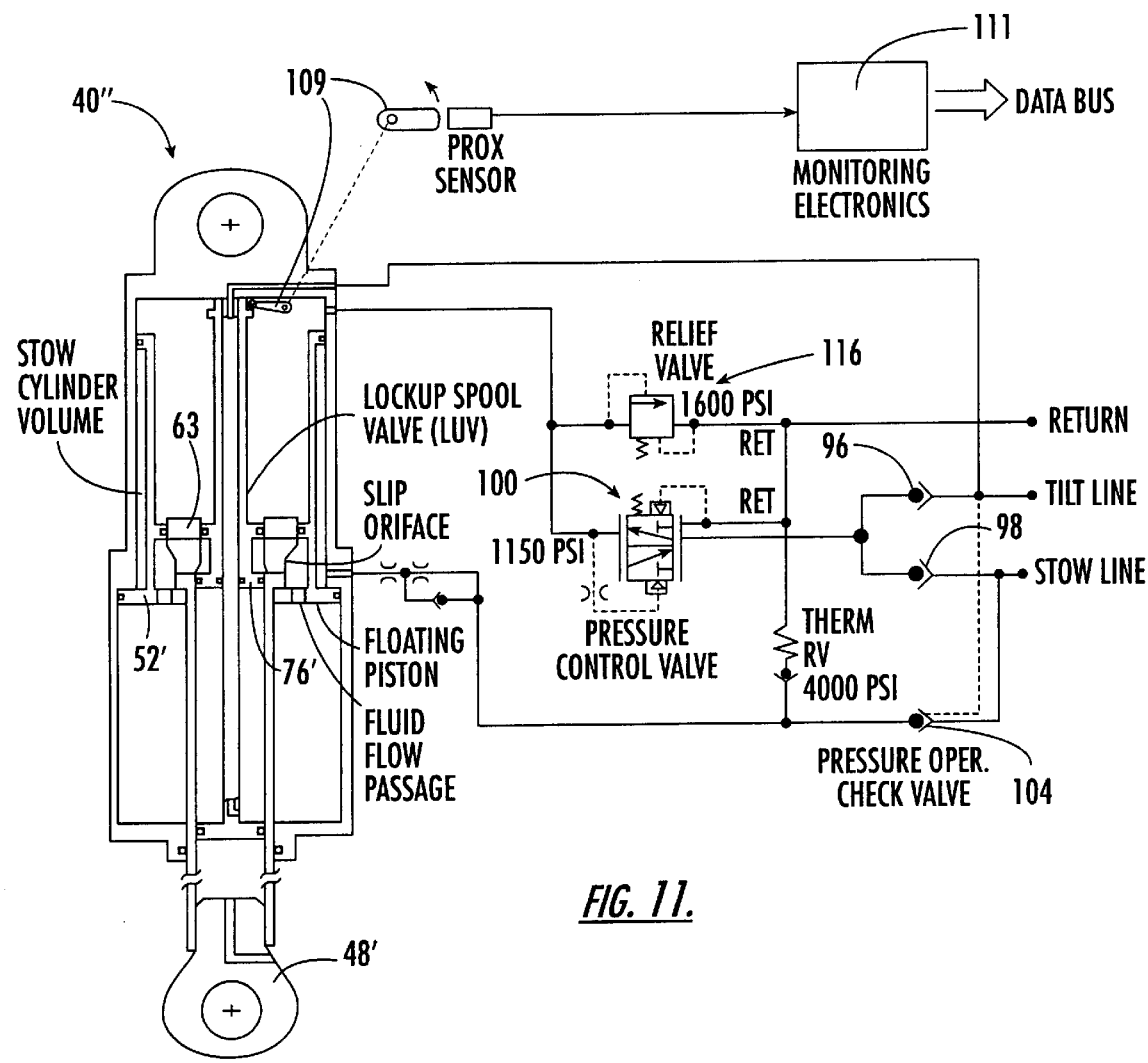
FIG. 11 shows a single-mode embodiment of a strut in accordance with the invention.

FIG. 11 depicts yet another embodiment of a strut 40" that differs from the strut 40' only in that the strut 40" is a single-mode strut lacking the capability of being switched from a landing mode to a takeoff mode. Thus, the mode-selecting solenoid valve 108, time delay unit 112, and ground-sensing system 113 are eliminated, and the lock-up valve 76' is continuously connected to the source of $P_{Tilt}$ pressure. The lock-up valve 76' still is extended when $P_{Tilt}$ is depressurized and $P_{stow}$ is pressurized to place the wheel truck in a stow position (as shown in FIG. 10).

Many modifications and other embodiments of the invention will come to mind to one skilled in the art to which this invention pertains having the benefit of the teachings presented in the foregoing descriptions and the associated drawings. For example, while the struts 40, 40', 40" have lock-up valve members that are actuated by fluid pressure to move between extended and retracted positions, other actuator devices can alternatively be used for moving the lock-up valve member, such as a motor and ball screw arrangement. It will also be appreciated that while particular piston geometries including a main piston and a floating piston have been described, and the fluid path between the two fluid chambers of the strut has been illustrated as being defined in a tubular portion of the main piston, the invention is not limited to such a configuration. The important feature of the strut is the provision of lock-up valve structure capable of cooperating with a piston assembly to close a fluid path between two chambers of the strut at an intermediate length of the strut less than the strut's maximum length. Various valve and piston structures can be used to accomplish this function. Furthermore, while the described and illustrated embodiments of the invention relate to a landing gear and auxiliary strut in which the auxiliary strut is attached between the main strut and a forward part of the bogie beam, an equivalent arrangement at least for some purposes can have the auxiliary strut attached to an aft part of the bogie beam, which would result in the bogie being tilted into a pitch-down attitude with the forward wheels down when the auxiliary strut locks up. This arrangement could be advantageous if, for example, other parts of the aircraft interfered with placing the auxiliary strut forward of the main strut. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A strut having lost motion and lock-up capabilities, comprising:

a cylinder barrel having a closed end and an open end;

a piston assembly slidably received through the open end of the cylinder barrel and comprising a floating piston contained within the cylinder barrel and slidable therein along an axis of the cylinder barrel, the floating piston having an end wall that divides the cylinder barrel into a pair of fluid chambers, the end wall of the floating piston having an aperture extending axially therethrough; and a main piston having a tubular portion slidably received through the open end of the cylinder barrel and through the aperture in the end wall of the floating piston such that the floating piston and main piston are slidable relative to each other, the floating piston and main piston cooperatively defining a fluid path between the two fluid chambers; and a lock-up valve operable to maintain said fluid path open so as to permit extension of the piston assembly during a portion of a stroke thereof until the strut reaches a predetermined lock-up length less than a maximum length thereof, and the lock-up valve sealingly engaging the main piston and the floating piston so as to close said fluid path when the strut reaches the predetermined lock-up length thus substantially preventing further extension of the piston assembly.

2. The strut of claim 1, wherein the tubular portion of the main piston defines snubbing holes therethrough providing the fluid path between the two fluid chambers.

3. The strut of claim 2, wherein the snubbing holes comprise a series of snubbing holes spaced lengthwise along the tubular portion of the main piston so as to be progressively closed by the lock-up valve as the strut approaches the predetermined length, such that snubbing of the movement of the main piston progressively increases as the snubbing holes are progressively closed, and the strut becomes locked at the predetermined length when all of the snubbing holes have been closed by the lock-up valve.

4. The strut of claim 2, wherein the snubbing holes comprise elongate orifices formed through the tubular portion of the main piston and extending lengthwise therealong so as to be progressively closed by the lock-up valve as the strut approaches the predetermined lock-up length, such that snubbing of the movement of the main piston progressively increases as the elongate orifices are progressively closed, and the strut becomes locked at the predetermined lock-up length when the elongate orifices have been fully closed by the lock-up valve.

5. The strut of claim 1, wherein the floating piston and main piston include cooperative engagement portions that coact upon retraction of the floating piston in the cylinder barrel such that retraction of the floating piston within the cylinder barrel causes retraction of the main piston to reduce the length of the strut relative to said predetermined lock-up length.

6. The strut of claim 5, wherein the floating piston includes a generally cylindrical portion connected to the end wall of the floating piston and arranged within the cylinder barrel such that an annular floating piston control chamber is defined between the cylindrical portion of the floating piston and an inner wall of the cylinder barrel, the strut including a fluid passage extending into the floating piston control chamber and adapted to be connected to a fluid source operable to selectively vary the pressure of fluid supplied through the fluid passage into the floating piston control chamber for controlling movement of the floating piston.

7. The strut of claim 6, further comprising a fluid passage extending into one of the fluid chambers of the strut and adapted to be connected to a fluid source.

8. The strut of claim 7, further comprising a fluid supply system connected to the fluid passages that extend into the floating piston control chamber and the one of the fluid chambers of the strut, the fluid supply system being operable to apply a differential fluid pressure of one sense between the floating piston control chamber and the one of the fluid chambers so as to retract the floating piston which in turn retracts the main piston, and being operable to apply a differential fluid pressure of an opposite sense between the floating piston control chamber and the one of the fluid chambers so as to extend the floating piston and the main piston.

9. The strut of claim 1, wherein the lock-up valve includes a valve member disposed within the tubular portion of the main piston, the valve member being slidable relative to the main piston for opening and closing the fluid path through the piston assembly.

10. The strut of claim 9, wherein the lock-up valve includes a lock-up control chamber supplied with control fluid by a control fluid supply passage, fluid pressure within the lock-up control chamber acting on the valve member so as to urge the valve member into a predetermined position with respect to the cylinder barrel such that the valve member closes the fluid path through the piston assembly when the strut reaches the predetermined lock-up length.

11. The strut of claim 10, wherein the valve member of the lock-up valve is selectively movable into either an extended position or a retracted position so as to selectively increase or decrease, respectively, the length of the strut at which the valve member closes the fluid path through the piston assembly.

12. The strut of claim 11, wherein the valve member of the lock-up valve is arranged so as to be acted upon on one side by fluid pressure existing in the lock-up control chamber and on an opposite side by fluid pressure existing in a first one of the fluid chambers, and further comprising a fluid supply system connected to the lock-up control chamber and to the first fluid chamber, the fluid supply system being operable to selectively apply a differential fluid pressure of one sense or an opposite sense between the lock-up control chamber and the fluid chamber of the strut so as to position the valve member in either the extended or retracted position, respectively.

* * * * *